United States Patent
Kapner

[11] Patent Number: 6,046,399
[45] Date of Patent: *Apr. 4, 2000

[54] ROOFING PANELS WITH INTEGRAL BRACKETS FOR ACCEPTING INCLINED SOLAR PANELS

[76] Inventor: Mark Kapner, 320 Amboy St., Metuchen, N.J. 08840

[*] Notice: This patent issued on a continued prosecution application filed under 37 CFR 1.53(d), and is subject to the twenty year patent term provisions of 35 U.S.C. 154(a)(2).

[21] Appl. No.: 08/782,229

[22] Filed: Jan. 13, 1997

[51] Int. Cl.⁷ .................................................. E04D 13/18
[52] U.S. Cl. .......................... 136/244; 136/291; 248/237; 52/173.3
[58] Field of Search .................................. 136/244, 246, 136/251, 291; 52/173.3; 126/600, 623; 248/237

[56] References Cited

U.S. PATENT DOCUMENTS

| | | | |
|---|---|---|---|
| 3,991,741 | 11/1976 | Northrup, Jr. et al. | 126/271 |
| 4,091,799 | 5/1978 | Steiner | 126/581 |
| 4,222,368 | 9/1980 | Rost et al. | 126/438 |
| 4,235,221 | 11/1980 | Murphy | 126/415 |
| 4,371,139 | 2/1983 | Clark | 248/237 |
| 4,886,554 | 12/1989 | Woodring et al. | 136/244 |
| 4,930,493 | 6/1990 | Sallis | 126/424 |
| 5,125,608 | 6/1992 | McMaster et al. | 248/163 |
| 5,228,924 | 7/1993 | Barker et al. | 136/246 |
| 5,316,592 | 5/1994 | Dinwoodie | 136/244 |
| 5,505,788 | 4/1996 | Dinwoodie | 136/246 |
| 5,746,839 | 5/1998 | Dinwoodie | 136/251 |
| 5,787,653 | 8/1998 | Sakai et al. | 52/173.3 |

Primary Examiner—Nam Nguyen
Assistant Examiner—Michael C. Miggins
Attorney, Agent, or Firm—Nims, Howes, Collison, Hansen & Lackert

[57] ABSTRACT

A roof assembly includes a plurality of insulation blocks disposed as a layer over a water-tight roofing membrane, a plurality of metal plates bonded to selected insulation blocks, each metal plate having at least one mounting bracket thereon for mounting at least one solar panels on the roof. Spacer struts are used to locate the solar panel at an optimum angle of an inclination relative to the roof. The use of metal plates bonded to the insulation blocks provides sufficient strength to withstand wind loads and avoids the cost and weight of conventional ballast systems.

12 Claims, 3 Drawing Sheets

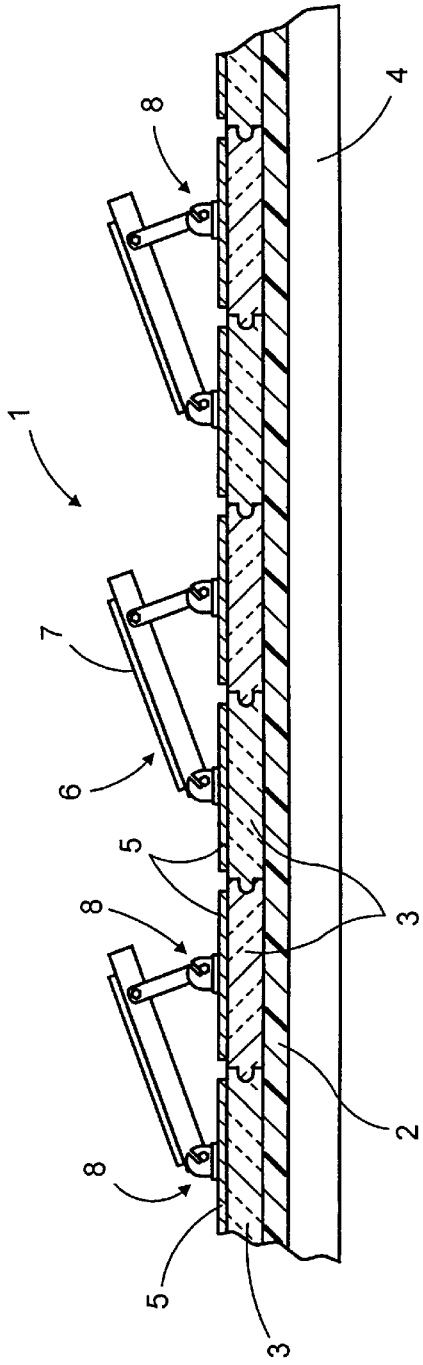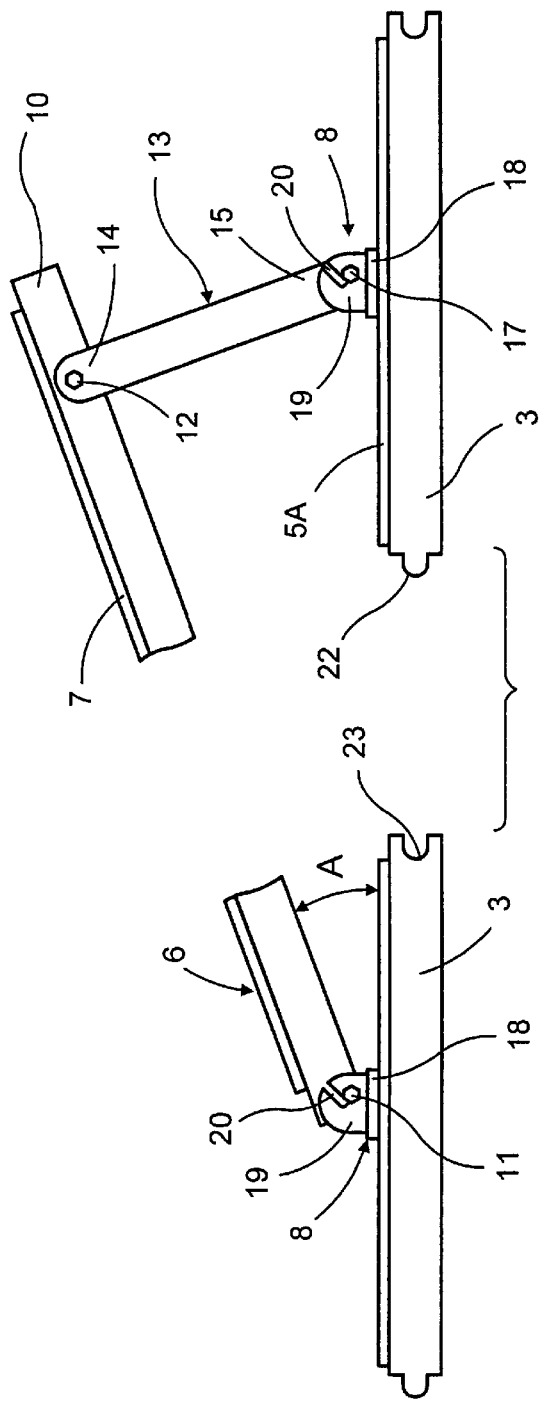

ROOFING PANELS WITH INTEGRAL BRACKETS FOR ACCEPTING INCLINED SOLAR PANELS

BACKGROUND OF THE INVENTION

This invention relates to roofing panels for accepting inclined solar panels thereon, and to an associated method for installing solar panels on a roof.

One type of roofing used on many large buildings is a protected membrane roofing system. In the PMR system, an insulation layer is situated above a roofing membrane, for protecting the membrane. Any rain water that passes through the insulation layer will flow over the membrane below for removal through drainage points. Such a system is commonly used on flat roofs of large buildings.

From a conservation and environmental perspective, it would be an advantage for more buildings to use solar panels to generate electric power, particularly those with large roof surface area. One barrier to such use is the high cost of labor and materials for installing a new roof with associated solar panels. With the development of new solar cell technology, it has been found that the non-solar cell components necessary for installing and utilizing a photovoltaic system, particularly the roof itself, become the critical factor which dominates the decision as to whether or not to use a solar system. This is particularly true with older building where substantial roofing modifications cannot be cost justified.

A commonly used technique for installing inclined solar panels on roofs uses gravel-filled ballast trays for anchoring the panels to the roof surface. The ballast trays must have considerable weight to perform their designated function of holding the inclined panels down at design wind loads. This weight, of course, places substantial stress on the roof and the roof supports, and the ballast required adds substantially to the cost of installation.

One method for installing solar panels on roofs, disclosed in U.S. Pat. No. 5,316,592 to Dinwoodie, involves shop assembling thermal insulation blocks directly to the bottom surfaces of photovoltaic modules to produce two-layer integral units and disposing the two layer units as a layer on top of an installed roofing membrane.

In U.S. Pat. No. 4,886,554 to Woodring et al., a photovoltaic cell and a tapered insulation block are respectively bonded to upper and lower surfaces of a paver to produce a three-layer paver unit which in turn is installed in a layer over a roofing membrane.

In both these methods, to obtain even a slight angle between the photovoltaic modules and a roof surface, the insulation blocks must be manufactured with that angle between their upper and lower sides. While such systems do not require ballast, they also do not provide an optimum angle for maximizing the efficiency of the solar panels. Additionally, there is no simple way to remove the integral solar panel for replacement or repair without disassembling the roof and exposing the underlying roof membrane. Further, the solar panel must be mounted when the insulation is installed, and does not provide for later adding a solar panel after the roof is installed. Finally, the integral insulation blocks remain costly to manufacture, since the photovoltaic modules must be mounted directly on an insulation block or to a paver. Transportation and installation of the roof components is more difficult since the photovoltaic modules are delicate, and are more likely to be damaged during roof construction.

SUMMARY OF THE INVENTION

An object of the present invention is to provide a method for placing solar panels on roofs with reduced roof weight in comparison with conventional ballast techniques.

An additional object is to provide a simple, low-cost method for installing solar panels on roofs.

Another object is to provide a method which facilitates the installation of tilted or inclined solar panels on horizontal roofs.

A further object of the present invention is to provide a solar panel array on a roof installed in accordance with such a method.

A further object is to provide an insulation material which can be installed in place of standard insulation without a significant cost increase but which can readily accept at a later time the installation of solar panels without substantial roof modifications.

It is another object to provide an insulation material which can replace portions of an existing insulation layer on a roof for retrofitting solar panels at minimized costs.

A further object of the present invention is to provide a means for independent removal of the solar panels without removal of the insulation material.

These and other objects of the present invention are achieved by a roof assembly which comprises an impermeable roofing membrane, a first plurality of insulation blocks disposed as a layer over the roofing membrane, a second plurality of metal plates bonded to selected insulation blocks, the metal plates having mounting means thereon for removably accepting panel mounting means therein which are part of a separate solar panel.

Preferably, the separate solar panel has a strut connected to an end thereof for mounting the solar panel at an inclined angle of orientation with respect to the roof. The plate mounting means are preferably lugs for accepting structures for fixing the panel mounting means thereto For example, bolts can be used to fix the panels to the lugs, or pins engagable with slots can be used.

Each of the insulation blocks is disposed over the membrane and each block has interlocking elements, e.g., tongues and grooves, for interconnecting the insulation blocks for providing a continuous cover over the membrane. They thus mimic a standard roofing system. Yet, by having selected blocks with metal plates arranged in a pattern, the roof can accommodate a later installed solar panel system.

The complete roof assembly comprises a roofing membrane, a plurality of insulation blocks disposed as a layer over the roofing membrane, a plurality of metal plates having mounting means bonded to selected insulation blocks, and at least one solar panel mounted to the metal plates, one end of the solar panel having a strut for spacing one end of the solar panel from one of the metal plates at an adjustable angle of inclination relative to the metal plates. Preferably, the lugs include L-shaped or angled slots to receive bolts connected to the solar panel.

A method for providing a solar panel on a roof comprises placing a watertight roofing membrane on a roof surface, providing a plurality of insulation blocks, selected insulation blocks having a metal plate bonded to an upper side thereof, the metal plates having mounting means thereon, positioning the insulation blocks with the metal plates over the membrane in a predetermined pattern on the roof surface to define areas for acceptance of solar panels, all of the insulation blocks placed in a layer over the roofing membrane, providing at least one solar panel, and removably connecting the solar panel to the mounting means.

The solar panel can be set at any predetermined angle of inclination relative to the roof surface, with from about 5 to 45 degrees preferred, by placing a spacer strut between one end of the solar panel and the mounting means.

The inventive roofing assembly provides ease of installation as an array of solar panels can be installed after the roof is installed, by simply bolting on the panels. In terms of labor, time and materials, this is comparable to a standard membrane roof but this system provides for ready acceptance of solar roofing panels, without ballast, a considerable savings over the prior art. The solar panels are also placed at the optimum angle with respect to the roof to maximize efficiency.

Another advantage is that the solar panels can be removed for replacement or repair without disassembling the roof, or can be retrofitted on an existing membrane roof by substitution of the inventive insulation blocks having the metal plates in place of selected insulation blocks, allowing existing buildings to more readily convert to the use of solar panels. To do this, the selected insulation blocks are removed and replaced with the insulation blocks of the invention, for acceptance of an array of solar panels. This is a one-time partial replacement of the insulation blocks which is much cheaper than replacing the entire roofing system.

A further advantage is a substantial reduction in the weight added to the roof, as no gravel-filled ballast trays are required. The weight of the metal sheets and the solar panels in addition to the strength of the interlocking insulation blocks is adequate to resist the uplift force, overturning moment, and sliding force along the roof due to wind loads on the inclined solar panels.

BRIEF DESCRIPTION OF THE DRAWING

FIG. 1 is a schematic cross-sectional view of a solar roofing assembly in accordance with the present invention.

FIG. 2 is a schematic side sectioned view of the solar panel connecting elements, insulation blocksand metal plates shown in FIG. 1.

DESCRIPTION OF THE PREFERRED EMBODIMENTS

Figure 3:
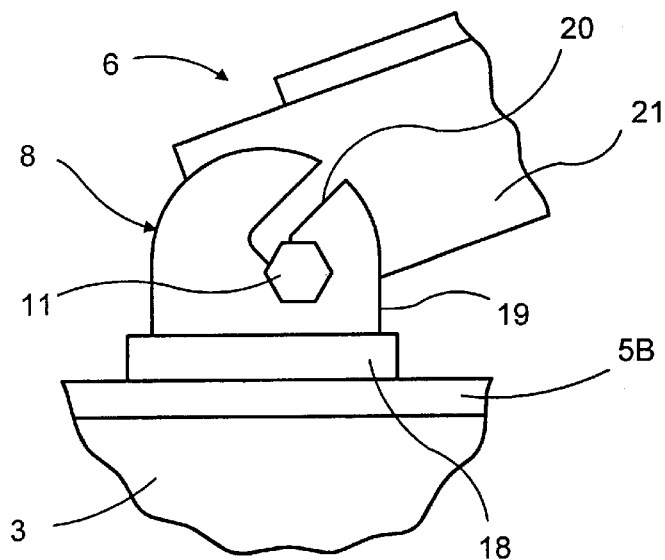
FIG. 3 is an enlarged sectioned view of the mounting bracket shown in FIGS. 1–2.

Referring to FIG. 1, a solar roofing assembly 1 comprises a water-tight roofing membrane 2 and a plurality of insulation blocks 3 disposed as a layer over the roofing membrane. The roofing membrane is placed over a suitable building roof 4, to prevent water penetration. Each insulation block 3 has a respective metal plate 5, bonded to an upper surface thereof, preferably made of galvanized steel for weather resistance. A plurality of solar panels 6 having photovoltaic modules 7 mounted thereon are in turn removably coupled to pairs of metal plates 5 via mounting brackets 8 as used herein. The term "solar panel" includes both solar heating and solar electric generating panels, though solar electric panels are discussed for illustration.

FIG. 2 is a side sectioned view showing the mounting of one solar panel to a roof, and it will be understood that the opposite side is a mirror image, having comparable elements. Each solar panel 6 has a side rail 10 having a pair of outwardly extending lugs or bolts 11 and 12. One lug or bolt is connected to a spacer strut 13. Each spacer strut has a length sufficient to provide an incline to the solar panel, with a first end 14 mounted to the side rail 10 by the bolt 12 inserted through a hole in the strut. A second end 15 of the strut is engaged to a mounting bracket 8 attached to the metal plate 5*a* by a bolt 17. Each mounting bracket 8 includes a base 18 and a receiver 19 having an L-shaped or angled slot 20 for receiving the respective bolt.

As shown in FIGS. 1 and 2, the strut serves to locate the solar panels 6 in an inclined orientation with respect to the roof. By adjusting the strut length, the preferred angle of from about 5 to 45 degrees can be accommodated.

Figure 4:
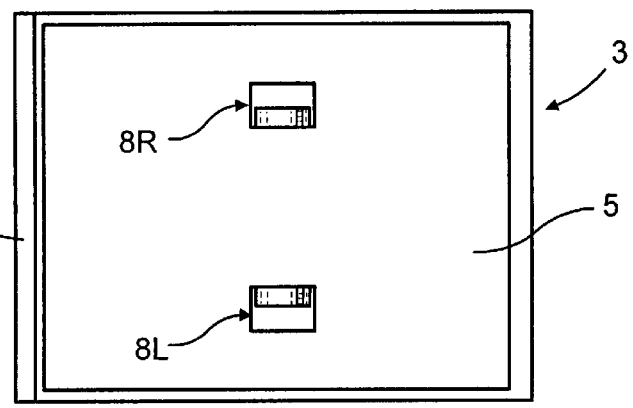
FIG. 4 is a schematic top view of an insulation block and an attached metal plate.

As seen in FIG. 3, a lower end 21 of each solar panel 6 is mounted to a mounting bracket 8 located on a metal plate 5*b* using the bolt 11. It is preferred to mount the lower end to one metal plate (5*b*) and the strut end of the solar panel to another metal plate (5*b*) so as to maximize the hold down strength of the assembly. FIG. 4 shows a top view of an insulation block 3 having two mounting brackets 8L and 8R for accepting either a lower end or an upper strut end of a solar panel.

To assemble the roof, the water-tight roofing membrane is disposed on a roof surface, which may be horizontal or inclined. A plurality of insulation blocks, selected ones having respective plates bonded to one side, are positioned contiguously in a layer on the top of the membrane so that the steel plates are arranged in a selected alignment for accepting solar panels in an array.

As shown in FIGS. 1 and 2, each insulation block 3 has tongues 22 and grooves 23 for interlocking the insulation blocks to each other over the roof membrane 2. After the membrane is covered, in essence completing the roof installation, the solar panels 6 with their associated photovoltaic modules 7 are connected to the mounting brackets 8 by inserting the bolts 11 and 17 into the slots 20 of their respective mounting brackets. Preferably, the struts are provided at a selected length so that the solar panels are automatically provided at an optimum predetermined angle of inclination (A) relative to the underlying roof surface. The angle A can be easily varied by providing spacer struts of different lengths, or by providing a telescoping strut that has an adjustable length.

The solar roofing assembly of the invention is particularly flexible in that the struts may be replaced or adjusted to change the angle of inclination in accordance with seasonal changes. The solar panels are also easily replaced for repair or upgrading purposes, without removing the insulation blocks and exposing the membrane to damage.

Figure 5:
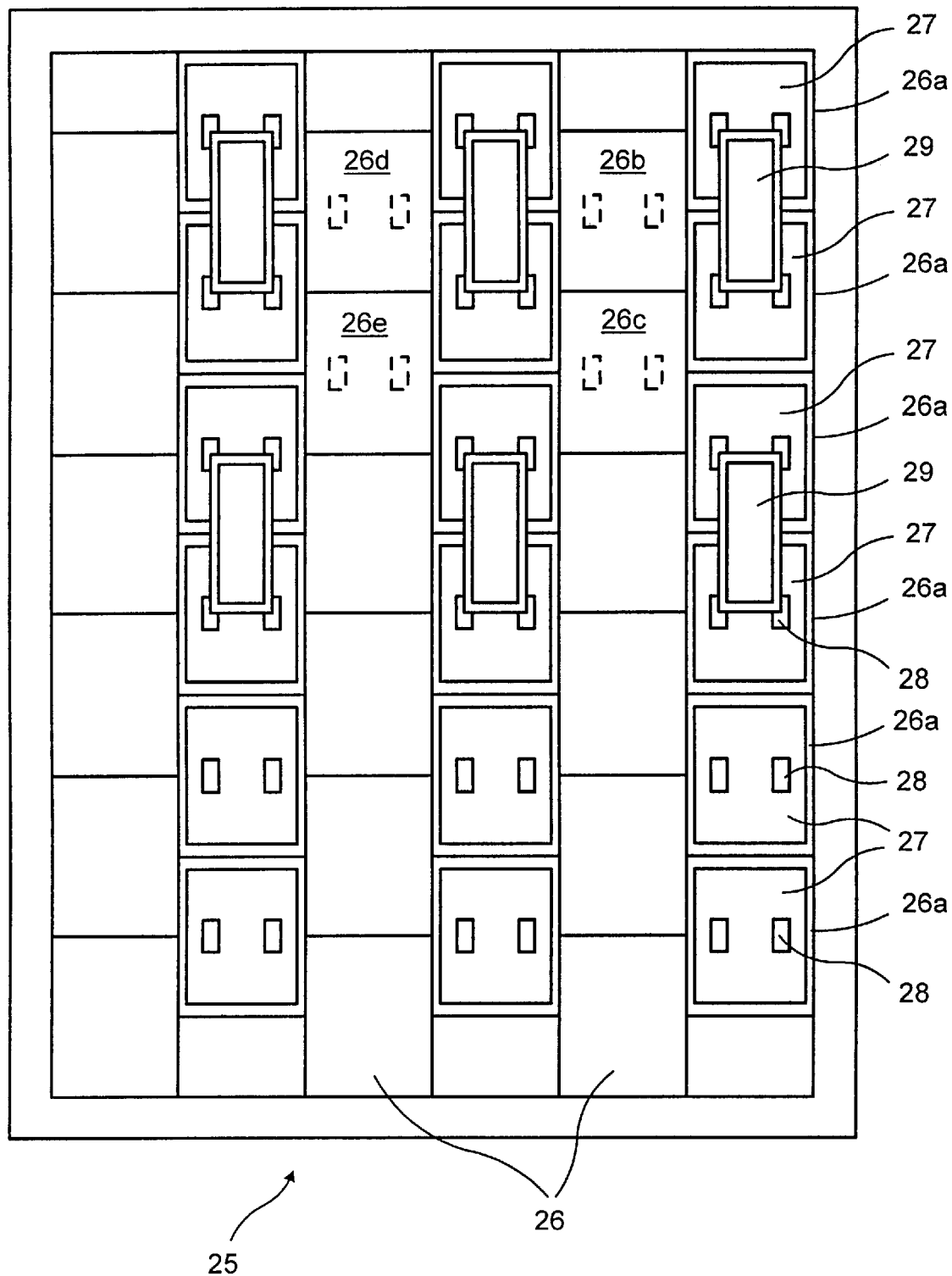
FIG. 5 is a top view of a roof including the inventive roofing panels.

Referring to FIG. 5, shown therin is a top view of a roof 25 having a plurality of insulation blocks 26 distributed thereover. Selected blocks 26*a* incorporate metal plates 27 having mounting brackets 28 thereon. Six solar panels 29 are attached to some of the selected panels, with the remaining selected panels available for future expansion, capable of accommodating three additional solar panels. The number of insulation blocks and solar panels is purely illustrative since it is likely that many more panels would be utilized on a conventional flat building roof. This simply demonstrates that solar panels can easily be replaced or added at a later date, depending on the economics of the system. Further, if desired, several of the non-selected insulation blocks, such as 26*b, c, d, e*, can later be replaced with insulation blocks containing mounting brackets, as shown in phantom, should additional expansion be desired. This illustrates that existing membrane roofing systems can be modified by replacing selected insulation panels to provide a solar panel array. Though exposing the membrane, this is a one-time exposure, after which solar panels can be added or removed as needed without disturbing the roof assembly.

Figure 6:
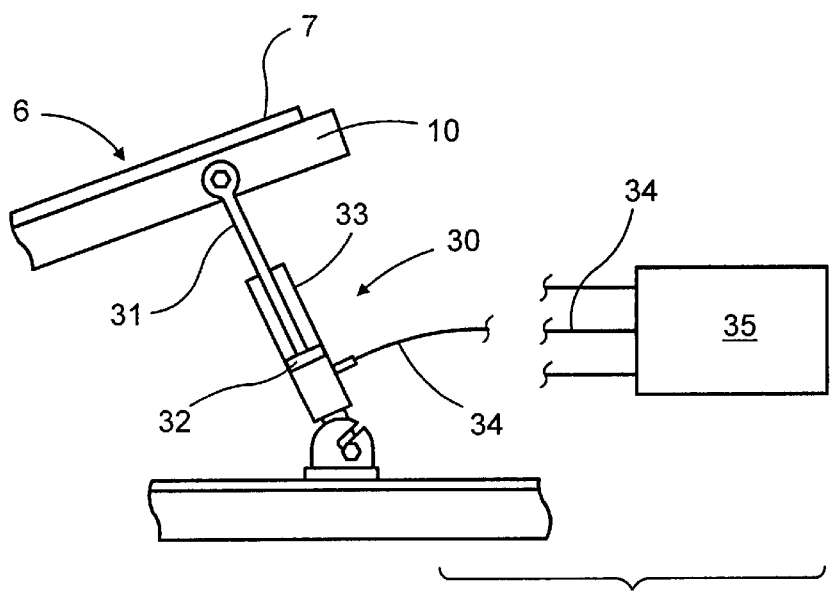
FIG. 6 is a schematic cross-sectional view of an adjustable strut for varying the inclined angle of the solar panel.

Referring to FIG. 6, an extendible strut 30 is used in place of the fixed struts for adjusting the angle of inclination to accommodate seasonal variations in the optimum angle relative to the sun. The extendible strut 30 has a rod 31 connected to a piston 32 located in an actuator housing 33 which responds to a control signal 34 emanating from a controller 35. The actuator can be pneumatic, electric or hydraulic activated in response to the control signal issued from the controller 35 which has, for example, a calendar program for adjusting the panel orientation. Preferably, the system has a manual control to allow overriding, for example, minimize the angle of inclination when it is known that a high wind condition may be expected.

Although the invention has been described in relation to particular embodiments, one of ordinary skill in the art, in light of this teaching, can generate additional embodiments and modifications without exceeding the scope of the claimed invention. For example, the roofing assembly described herein may be used on a roof surfaces other than horizontal. Also, it is contemplated that the dimensions of the insulation blocks and associated metal plates, as well as the numbers and locations of mounting brackets, may vary to enhance construction flexibility.

Accordingly, it is to be understood that the drawings and description are proffered by way of example to facilitate comprehension of the invention and should not be construed to limit the scope thereof.

What is claimed is:

1. A membrane roof assembly for selectively mounting one or more inclined solar panels on a roof the solar panels inclined relative to the roof, and retained thereon without using ballast, the solar panels installed and removed without disturbing the membrane roof assembly comprising:

a roofing membrane;

a plurality of insulation blocks disposed as a layer over the roofing membrane, the blocks being interlocked together;

a plurality of metal plates permanently bonded to a top surface of selected insulation blocks, each metal plate covering a portion of the insulation block and having means for releasibly mounting at least one end of a solar panel thereon, the means for mounting being one or more mounting brackets having receptacles for receiving fixtures for selectively attaching the at least one end of the solar panel to the brackets;

the insulation blocks with the metal plates positioned in a predetermined array among the plurality of insulation blocks thereby completing the roof assembly with at least a first metal plate and a second metal plate positioned adjacent to each other;

the second metal plate having means for mounting being one or more mounting brackets having receptacles for selectively attaching a second end of the solar panel thereto, the weight of the solar panel and of the metal plates being sufficient to resist uplift force, overturning moment and sliding force caused by wind loads acting on the inclined solar panel without the need for ballast.

2. The roof assembly of claim 1, further comprising at least one solar panel removably coupled to at least one of the metal plates.

3. The roof assembly of claim 1 wherein the solar panel has a spacer strut connecting an end of the solar panel to a mounting means for locating the solar panel at an inclined angle relative to the metal plates.

4. The roof assembly of claim 3 wherein the strut is adjustable to adjust the angle of inclination of the solar panel.

5. The roof assembly of claim 4 further comprising a controller for adjusting the angle of inclination.

6. The roof assembly of claim 4 wherein the strut comprises a rod extendable from an actuator.

7. The roof assembly of claim 3 wherein the inclination angle is from about 5 to 45 degrees.

8. The roof assembly of claim 1 wherein the receptacle is a slot, the fixture being a bolt receivable in the slot.

9. The roof assembly of claim 1 wherein the insulation blocks have interlocking elements for connecting the insulation blocks to one another.

10. A method for providing a membrane roof assembly configured to accept one or more solar panels inclined on roof, the method allowing installation and removal of the solar panels without disturbing the membrane roof assembly, the solar panels inclined relative to the roof and retained thereon without using ballast comprising:

disposing a watertight roofing membrane on a roof surface;

providing a plurality of interlocking insulation blocks, selected ones of the plurality of insulation blocks having a metal plate permanently bonded to a top surface thereof, each metal plate covering a substantial portion of the insulation block and having means for removably mounting at least one end of a solar panel thereon, the means for mounting being one or more mounting brackets having receptacles for receiving fixtures for selectively attaching the at least one end of the solar panel thereto;

positioning the insulation blocks with the metal plates in a predetermined array among the plurality of insulation blocks over the membrane on the roof surface so that all the interlocking insulation blocks are contiguous with each other thereby completing the membrane roof assembly, at least a first metal plate and a second metal plate positioned adjacent to each other;

providing at least one solar panel; and removably attaching the at least one solar panel at an inclined angle on the roof, the solar panel removably attached at one end to the first metal plate and a second end removably attached to the second metal plate, such that the weight of the solar panel and weight of the metal plates are sufficient to resist the uplift force overturning moment and sliding force, caused by wind loads acting on the inclined solar panel without the need for ballast.

11. The method of claim 10 further comprising providing at least one spacer strut for each solar panel and placing the solar panel at a predetermined angle of inclination relative to the roof.

12. The method of claim 11 wherein the strut is adjustable to adjust the angle of inclination.

* * * * *